UNITED STATES PATENT OFFICE.

FERDINAND BLUMENTHAL, OF COLOGNE-BRAUNSFELD, GERMANY.

PROCESS OF MANUFACTURING A WATER-SOFTENING REAGENT.

1,285,603. Specification of Letters Patent. Patented Nov. 26, 1918.

No Drawing. Application filed January 3, 1918. Serial No. 210,222.

*To all whom it may concern:*

Be it known that I, FERDINAND BLUMENTHAL, chemist, subject of the King of Prussia, German Emperor, residing at 233 Maarweg, Cologne-Braunsfeld, Germany, have invented certain new and useful Improvements in the Process of Manufacturing a Water-Softening Reagent, of which the following is a specification, reference being had therein to the accompanying drawing.

My invention relates to an improved process of manufacturing a water-softening reagent, and it consists in precipitating iron silicate of iron-salts by the addition of water-glass to a solution of iron salts, thereby preliminarily forming a substance capable of exchanging bases, which substance, by itself, offers certain advantages in comparison to the basic silicates of aluminum in the process of Patent No. 1,212,007 for softening water and, further, in improving said capability of exchanging bases by treating the said preliminary precipitate with a heated alkaline solution, such, for instance, as soda, caustic soda and the like.

In carrying my invention into practice, I prefer to boil the said precipitate of iron-salts with an equal portion in weight of a ten per-cent. solution of soda or caustic soda and in removing the surplus alkalinity by washing it out with soft water. By such treatment, the physical quality of the substance undergoes no change, but the capability of exchanging bases is doubled.

It has been found that a precipitate of the kind described and treated as set forth, which, in the original state, possesses a capability of exchanging bases of about 1 per-cent. CaO, proved to render, after the treatment described, a capability of 2 per-cent., the amount of chlorid of sodium having been in both cases about five times the theoretical amount.

Trials have shown, that it is preferable or even necessary to employ the alkaline solution in a highly heated state, at least at a temperature of over 60° C., the boiling temperature having been found best in most cases, but a still higher temperature being advisable in some cases.

The present process has for its purpose to enrich the precipitate obtained from the action of water-glass on a solution of perchlorid of iron with the base obtained by exchange. Such base, in the present case, can only be potassium sodium protoxid, and, accordingly, the said precipitate must be treated with corresponding chemical agents, viz.: carbonate of sodium or caustic soda, or carbonate of potassium or caustic potash. The two first-named reagents have been found preferable and the best means of employing the same is the boiling state. Ammonia, however, is no base which could be employed for practically purifying water and it is by no means probable that it could be employed as an exchangeable base in connection with the present silicate. The treatment with ammonia, therefore, could not form any improvement of the capability of exchange of the base.

I claim as my invention:—

1. An improved process of manufacturing a water-softening reagent, consisting in, first, producing a precipitate from iron-salts in solution by means of water-glass and, subsequently, treating said precipitate with a heated alkaline solution, for the purpose of increasing its capability of exchanging the base.

2. An improved process of manufacturing a water-softening reagent, consisting, first, in producing a precipitate from iron-salts in solution by means of water-glass, and, subsequently, boiling said precipitate with a heated alkaline solution.

3. An improved process of manufacturing a water-softening reagent, consisting in boiling the precipitate obtained by adding water-glass to a solution of iron salts and boiling said precipitate with an alkaline solution heated above the boiling point.

In testimony whereof I have affixed my signature in the presence of two witnesses.

FERDINAND BLUMENTHAL.

Witnesses:
 WILHELM LÜTZ,
 PETER PAAS.